(12) United States Patent
Mullins

(10) Patent No.: US 8,810,367 B2
(45) Date of Patent: Aug. 19, 2014

(54) ELECTRONIC DEVICE WITH MULTIMODE FINGERPRINT READER

(75) Inventor: Scott Mullins, Morgan Hill, CA (US)

(73) Assignee: Apple Inc., Cupertino, CA (US)

(*) Notice: Subject to any disclaimer, the term of this patent is extended or adjusted under 35 U.S.C. 154(b) by 168 days.

(21) Appl. No.: 13/240,370

(22) Filed: Sep. 22, 2011

(65) Prior Publication Data

US 2013/0076485 A1    Mar. 28, 2013

(51) Int. Cl.
*H04N 21/4415*    (2011.01)

(52) U.S. Cl.
USPC .............. 340/5.83; 340/5.53; 340/539.23; 340/686.6; 382/115; 382/124; 382/126; 345/173; 713/186

(58) Field of Classification Search
CPC ...... G06F 21/32; G06Q 20/40; G06Q 20/327; G06Q 20/3278; G07C 2009/00095; G07C 9/00563
USPC ........ 340/5.1, 5.2, 5.52, 5.53, 5.8, 5.82, 5.83; 382/115, 124, 126
See application file for complete search history.

(56) References Cited

U.S. PATENT DOCUMENTS

| | | | |
|---|---|---|---|
| 6,392,636 B1* | 5/2002 | Ferrari et al. | 345/173 |
| 7,673,149 B2* | 3/2010 | Ritter et al. | 713/186 |
| 7,697,729 B2* | 4/2010 | Howell et al. | 382/115 |
| 7,907,710 B2 | 3/2011 | Stepanian | |
| 8,045,767 B2* | 10/2011 | Du et al. | 382/124 |
| 2008/0205714 A1 | 8/2008 | Benkley et al. | |
| 2009/0160609 A1 | 6/2009 | Lin et al. | |
| 2009/0224874 A1* | 9/2009 | Dewar et al. | 340/5.53 |
| 2010/0311390 A9 | 12/2010 | Black et al. | |
| 2011/0006880 A1* | 1/2011 | Long et al. | 340/5.83 |
| 2011/0080260 A1 | 4/2011 | Wang et al. | |
| 2011/0084801 A1 | 4/2011 | Wang et al. | |
| 2012/0019356 A1* | 1/2012 | Gagneraud et al. | 340/5.32 |
| 2012/0044156 A1* | 2/2012 | Michaelis et al. | 345/173 |
| 2012/0242635 A1* | 9/2012 | Erhart et al. | 345/207 |
| 2012/0303476 A1* | 11/2012 | Krzyzanowski et al. | 705/26.5 |
| 2013/0024360 A1* | 1/2013 | Ballout | 705/39 |

* cited by examiner

*Primary Examiner* — Daniel Wu
*Assistant Examiner* — Benyam Haile
(74) *Attorney, Agent, or Firm* — Treyz Law Group; G. Victor Treyz

(57) ABSTRACT

An electronic device may operate a fingerprint reader in a stationary finger mode in which the fingerprint reader captures a fingerprint from a user's finger while the user's finger is in a stationary position and may operate the fingerprint reader in a moving finger mode in which the fingerprint reader captures a fingerprint from the user's finger while the user is swiping the finger across the fingerprint reader. The electronic device may use the moving finger mode when performing sensitive operations such as operations related to financial transactions. The electronic device may include near field communications circuitry. When activity is detected using the near field communications circuitry, the fingerprint reader may be operated in the moving finger mode. The fingerprint sensor may be activated when a proximity sensor detects the presence of a finger. Different actions may be taken by the device in response to detection of different fingerprints.

15 Claims, 15 Drawing Sheets

ELECTRONIC DEVICE WITH MULTIMODE FINGERPRINT READER

BACKGROUND

This relates to fingerprint readers and, more particularly, to electronic devices with fingerprint readers.

Electronic devices such as computers often include fingerprint readers. For example, a laptop computer may use a fingerprint reader to authenticate users. If a user does not present a fingerprint that matches the fingerprint of a registered user, the user will not be authorized to access the computer.

Some fingerprint readers capture fingerprints while a user's finger is held in a stationary position on the fingerprint reader. A user of this type of fingerprint reader may inadvertently leave a residual fingerprint on the reader. An attacker can potentially reactivate the residual fingerprint and thereby gain unauthorized access to a system.

Moving-fingerprint fingerprint readers require that a user swipe a finger across the reader. This type of fingerprint reader is potentially more secure than stationary-fingerprint fingerprint readers, because there is no possibility for an attacker to reactivate a residual fingerprint. It can, however, be cumbersome to require that a user swipe a finger across a fingerprint reader whenever fingerprint reader functions are desired.

It would therefore be desirable to be able to provide improved fingerprint reader arrangements for electronic devices.

SUMMARY

An electronic device may have a fingerprint reader that is used in gathering fingerprints from a user. The electronic device may have a display. The fingerprint reader may be located in a portion of the display.

The fingerprint reader may have a two-dimensional array of sensor electrodes. The electronic device may operate the fingerprint reader in a stationary finger mode in which all of the sensors in the two-dimensional array of sensors are used to capture a fingerprint from the user's finger while the user's finger is in a stationary position on the fingerprint reader. The electronic device may also operate the fingerprint reader in a moving finger mode in which all of the two-dimensional sensors in the array or only a subset of the sensors in the array are used to capture a fingerprint from the user's finger while the user is swiping the finger across the fingerprint reader.

The electronic device may use the stationary finger mode and the moving finger mode to support different types of device operations. For example, the electronic device may use the moving finger mode when performing sensitive operations such as financial transactions.

The electronic device may include near field communications circuitry. When activity is detected using the near field communications circuitry, the fingerprint reader may be operated in the moving finger mode.

The fingerprint sensor may be activated when a proximity sensor detects the presence of a finger. Different actions may be taken by the device in response to detection of different fingerprints. For example, the device may launch a first software application when a first fingerprint is detected and may launch a second software application when a second fingerprint is detected.

Further features of the invention, its nature and various advantages will be more apparent from the accompanying drawings and the following detailed description of the preferred embodiments.

DETAILED DESCRIPTION

Figure 1:
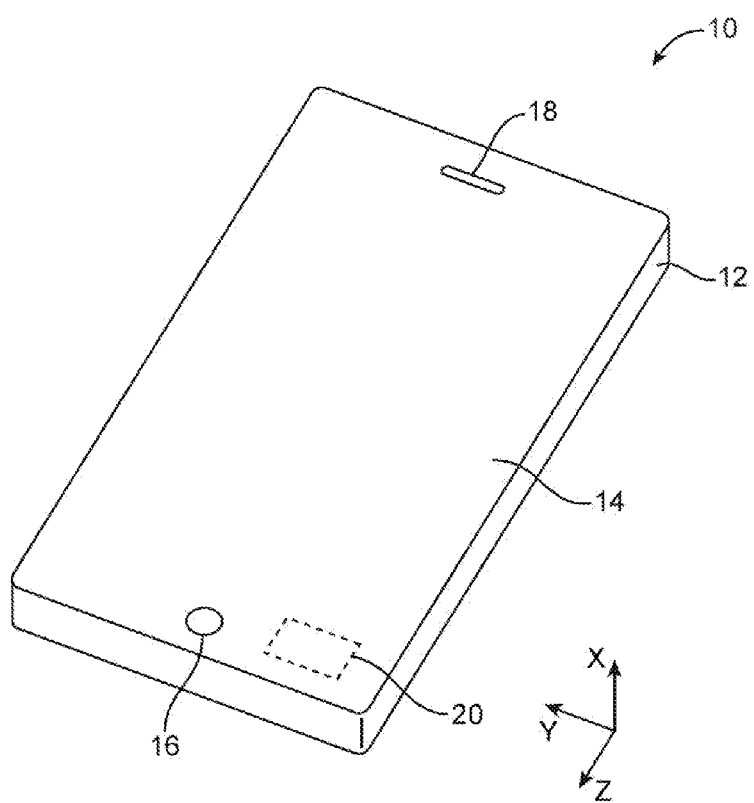
FIG. 1 is a perspective view of an illustrative electronic device with a fingerprint reader in accordance with an embodiment of the present invention.

Electronic devices such as device 10 of FIG. 1 may be provided with a fingerprint reader. The fingerprint reader may operate in multiple modes. For example, the fingerprint reader may operate in a stationary finger mode and a moving finger mode. In the stationary finger mode, a fingerprint can be captured while a user holds a finger in a stationary position on the fingerprint reader. In the moving finger mode, a fingerprint can be captured while the user swipes a finger across the fingerprint reader.

The fingerprint reader may contain a two-dimensional array of sensors such as capacitive sensors, radio-frequency sensors, light sensors, or pressure sensors (as examples). In stationary finger mode, the two-dimensional array of sensors may be used to capture a fingerprint from a stationary finger. In moving finger mode, all or part of the sensor array may be used to capture a series of full or partial fingerprint data frames from a moving finger. The fingerprint data frames can then be reconstructed to produce a complete fingerprint.

Electronic device 10 may a portable computer, a tablet computer, a computer monitor, a handheld device, global positioning system equipment, a gaming device, a cellular telephone, portable computing equipment, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using an unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. The edges (sidewalls) of housing 12 may be straight (vertical) or may be curved (e.g., housing 12 may be provided with sidewalls formed from rounded extensions of a rear planar housing wall).

As shown in FIG. 1, the front of device 10 may include a display such as display 14. The surface of display 14 may be covered with a layer of material such as glass or plastic. The layer of material on the front of display 14 may be, for example, a display cover layer formed from a layer of clear glass, a layer of clear plastic, or other transparent materials (e.g., materials that are transparent to visible light and that are generally transparent to infrared light). The cover layer that covers display 14 may sometimes be referred to as a display cover layer, display cover glass, or plastic display cover layer. In a configuration of the type shown in FIG. 1, the cover layer may be formed form a planar member such as a planar sheet of glass or plastic. Other cover layer shapes such as convex and concave shapes may be used if desired.

Display 14 may, for example, be a touch screen that incorporates capacitive touch electrodes or a touch sensor formed using other types of touch technology (e.g., resistive touch, light-based touch, acoustic touch, force-sensor-based touch, etc.). Display 14 may include image pixels formed from light-emitting diodes (LEDs), organic LEDs (OLEDs), plasma cells, electronic ink elements, liquid crystal display (LCD) components, or other suitable image pixel structures.

Device 10 may include input-output ports, buttons, sensors, status indicator lights, speakers, microphones, and other input-output components. As shown in FIG. 1, for example, device 10 may include one or more openings in display 14 to accommodate buttons such as button 16 and a speaker port such as speaker port 18. Device 10 may also have openings in other portions of display 14 and/or housing 12 to accommodate input-output ports, speakers, microphones, and other components.

A fingerprint reader such as fingerprint reader 20 may be implemented using sensors in part of display 14 (e.g., a two-dimensional sensor array in an active portion of display 14 in which display pixels are used in displaying images for a user of device 10 and/or an inactive portion of display 14 that does not contain display pixels). Although shown as being located in the lower right-hand corner of display 14 in the example of FIG. 1, the sensors that form fingerprint reader 20 may be located in other portions of device 10 if desired. For example, fingerprint reader 20 may be located on the rear surface of device 10, on a sidewall surface of device 10, or on a different portion of the front surface of device 10.

Figure 2:
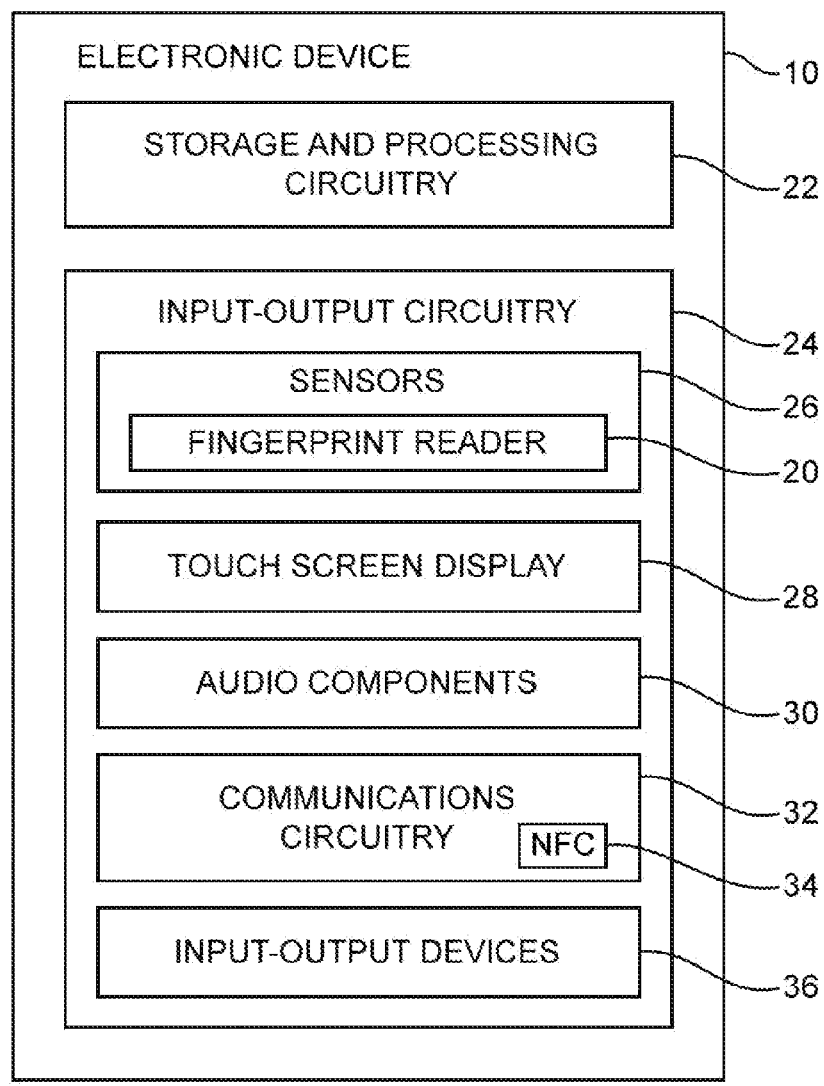
FIG. 2 is a schematic diagram of an illustrative electronic device with a fingerprint reader in accordance with an embodiment of the present invention.

A schematic diagram of an illustrative electronic device such as electronic device 10 of FIG. 1 is shown in FIG. 2. As shown in FIG. 2, electronic device 10 may include control circuitry such as storage and processing circuitry 22. Storage and processing circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 22 may be used to control the operation of device 10. This processing circuitry may be based on one or more microprocessors, microcontrollers, digital signal processors, baseband processors, power management units, audio codec chips, application specific integrated circuits, display driver integrated circuits, etc.

Storage and processing circuitry 22 may be used to run software on device 10 such as internet browsing applications, voice-over-internet-protocol (VOIP) telephone call applications, email applications, media playback applications, operating system functions, functions associated with wireless payments and other financial transactions, etc. The software may be used to implement functions related to biometric authentication. For example, the software (and associated hardware of device 10) may be used in gathering and authenticating fingerprint data or other biometric data. Biometric data processing functions such as fingerprint authentication functions and control operations associated with verifying fingerprints and taking suitable actions may be implemented in real time using storage and processing circuitry 22 and associated hardware such as fingerprint reader hardware. Circuitry 22 may, for example, be configured to implement a control algorithm that controls the gathering and use of fingerprint data from fingerprint reader 20.

Input-output circuitry 24 may be used to allow data to be supplied to device 10 and to allow data to be provided from device 10 to external devices. Input-output circuitry 24 may include sensors 26. Sensors 26 may include ambient light sensors, proximity sensors, touch sensors (e.g., capacitive touch sensors that are part of a touch screen display or that are implemented using stand-alone touch sensor structures), accelerometers, and other sensors. Sensors 26 may include sensors for gathering biometric data from a user. For example, sensors 26 may include one or more fingerprint readers such as fingerprint reader 20.

As described in connection with FIG. 1, fingerprint reader 20 may be located under a portion of display 14 (e.g., in the lower right corner of display 14 as shown in FIG. 1). Fingerprint reader 20 may also be located on other portion of display 14 or on sidewalls or rear wall surfaces of housing 12, if desired.

Fingerprint reader 20 may include a two-dimensional array of sensors. The two-dimensional array of sensors may be operated in a stationary finger mode in which fingerprint data is gathered while a user's finger is held in a stationary position on the two-dimensional array of sensors. In stationary finger mode, data is generally gathered from all of the sensors in the two-dimensional array of sensors.

All of the sensors in the two-dimensional array of sensors or a subset of the sensors may be used in gathering fingerprint data when the fingerprint reader is operated in a moving finger mode. In the moving finger mode, a user's finger is moved across the surface of the fingerprint reader during the process of gathering fingerprint data.

The sensors in fingerprint reader 20 may be based on capacitive sensors, optical sensors, pressure sensors, radio-frequency sensors, or other sensors. With an illustrative capacitive sensor arrangement, each of the sensors in the two-dimensional array of sensors may be formed from an indium tin oxide electrode or an electrode formed from aluminum, copper, or other metals or conductive materials. Detected capacitance changes can be used to measure the patterns of a user's finger (sometimes referred to as fingerprint minutiae) when a user presses a finger against the reader while the reader is operating in a stationary finger mode or when a user swipes a finger across the reader while the reader is operating in a moving finger mode. In general, any type of fingerprint reader technology may be used in gathering fingerprint data from a user's fingers. The use of capacitive sensors in a fingerprint reader is merely illustrative.

As shown in FIG. 2, input-output circuitry 24 may contain one or more displays such as display 28. Display 28 may be a liquid crystal display, an organic light-emitting diode display, an electronic ink display, a plasma display, a display that uses other display technologies, or a display that uses any two or more of these display configurations. Display 28 may include an array of touch sensors (i.e., display 28 may be a touch screen). The touch sensors may be capacitive touch sensors formed from an array of transparent touch sensor electrodes such as indium tin oxide (ITO) electrodes or may be touch sensors formed using other touch technologies (e.g., acoustic touch, pressure-sensitive touch, resistive touch, etc.). Touch sensors (e.g., capacitive touch sensor electrodes) for display 28 and fingerprint reader 20 may be formed on a common substrate or may be formed on one or more different substrates.

Audio components 30 may be used to provide device 10 with audio input and output capabilities. Examples of audio components that may be included in device 10 include speakers, microphones, buzzers, tone generators, and other components for producing and detecting sound.

Communications circuitry 32 may be used to provide device 10 with the ability to communicate with external equipment. Communications circuitry 32 may include analog and digital input-output port circuitry and wireless circuitry that communicates using radio-frequency signals and/or light. Communications circuitry 32 may, for example, include antenna structures and radio-frequency transceiver circuitry for handling cellular telephone communications and wireless local area network communications.

Communications circuitry 32 may also include wireless circuitry such as circuitry 34 for handling near field communications (NFC) wireless traffic. Circuitry 34 may include NFC antennas and NFC radio-frequency transceiver circuitry for transmitting and receiving near-field electromagnetic signals. Communications arrangements involving NFC signals are sometimes used in making wireless payments. For example, a user of a device such as device 10 may use NFC circuitry 34 to communicate with an NFC terminal at a store during a wireless payment transaction. During an NFC transaction, device 10 and the NFC terminal may exchange NFC signals over a relatively short distance (e.g., 20 cm or less, 10 cm or less, or 4 cm or less) using near field electromagnetic coupling between the NFC antenna structures in device 10 and corresponding NFC antenna structures in the NFC terminal. To initiate NFC sessions, NFC terminals at establishments such as stores and other locations and/or NFC equipment in device 10 may broadcast NFC signals that are received by nearby equipment (e.g., corresponding NFC equipment in devices such as device 10 and/or NFC terminals in stores or other establishments).

Device 10 may include a battery, power management circuitry, and other input-output devices 36. Input-output devices 36 may include buttons, joysticks, click wheels, scrolling wheels, touch pads, key pads, keyboards, cameras, light-emitting diodes and other status indicators, etc. Input from input-output devices 36 may be used in conjunction with input from other input-output circuitry 24 in controlling device 10. Such additional input may include, for example, input from fingerprint reader 20 and other sensors 26, input from NFC circuitry 34, input from touch screen display 28 (e.g., input associated with user selection of an on-screen option), audio input from components 30, etc. During operation of device 10, a user can control the operation of device 10 by supplying commands through input-output circuitry 24 and may receive status information and other output from device 10 using the output resources of input-output circuitry 24.

Figure 3:
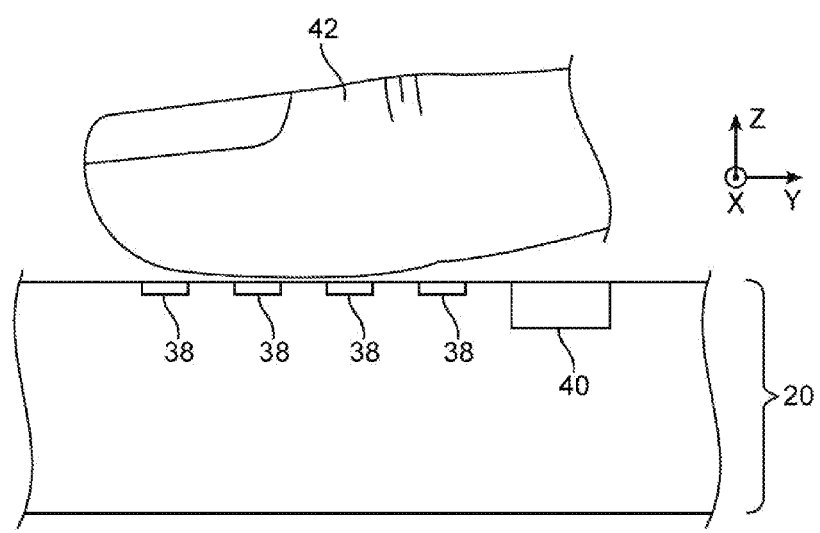
FIG. 3 is a cross-sectional side view of a fingerprint reader for an electronic device in accordance with an embodiment of the present invention.

FIG. 3 is a cross-sectional side view of an illustrative configuration that may be used in implementing fingerprint reader 20. As shown in FIG. 3, fingerprint reader 20 may include an array of sensors 38. Sensors 38 may be organized in a two-dimensional array (e.g., an array of multiple rows and multiple columns in the X-Y plane of FIG. 3). Optional additional sensor structures such as sensor structures 40 may be included in fingerprint reader 20 if desired. Structures 40 may be, for example, one or more proximity sensors implemented using capacitive electrodes, one or more proximity sensors implemented using light (e.g., a light emitter and a corresponding light detector for measuring reflected light from a user's finger such as finger 42), or other suitable sensors. Proximity sensor structures such as sensor 40 may, if desired, be implemented using one or more electrodes in touch screen display 28. A proximity sensor for fingerprint reader 20 may also be formed by monitoring one or more sensor signals from sensors 38 (individually or collectively). Proximity sensor data may be used in controlling device functions. For example, fingerprint reader functions associated with using fingerprint reader 20 may be activated in response to measured proximity sensor signals. Device 10 may, for example, activate fingerprint sensor 20 in response to detection of finger 42 in the vicinity of fingerprint reader 20.

Fingerprint reader 20 may operate in multiple modes. For example, fingerprint reader 20 may operate in a stationary finger mode and a moving finger mode. Device 10 may also inactivate fingerprint reader 20 when no fingerprint input is desired.

In the stationary finger mode, reader 20 may capture fingerprint data from finger 42 while a user holds finger 42 stationary relative to fingerprint reader 20 (i.e., while finger 42 does not move significantly in dimensions X, Y, or Z of FIG. 3). There is a potential for fingerprint data to become blurred if a user moves finger 42 during stationary finger mode operations. It may therefore desirable to display instructions on display 14 that direct the user to hold finger 42 stationary during the stationary finger mode.

In the moving finger mode, reader 20 may capture fingerprint data from finger 42 while a user moves finger 42 across reader 20. A user may, for example, move finger 42 in lateral direction Y, in lateral direction X, or in a diagonal direction in the X-Y plane. As finger 42 is moved (swiped) across sensors 38 in fingerprint reader 20, sensors 38 may capture fingerprint data for substantially all of the user's fingerprint. A two-dimensional array of sensors 38 (e.g., the full set of sensors 38 in reader 20), a two-dimensional subset of sensors 38 (e.g. a subset of the rows of sensors in the array), or a one-dimensional subset of sensors 38 (e.g., a single row of sensors in the array) may be used in capturing fingerprint data during operations in moving finger mode. A user's finger should be moving during the data capture process to ensure that the fingerprint data is captured properly. It may therefore be desirable to display instructions on display 14 that direct the user to swipe finger 42 across fingerprint reader 20 during operations in moving finger mode.

When fingerprint reader 20 is operated in the stationary finger mode, it is possible for a user to leave a residual fingerprint on reader 20 following use of reader 20. An attacker might potentially try to reactivate the residual fingerprint by placing a moist object on top of the residual fingerprint. Because there may be a potential for attacks of this type when operating fingerprint reader 20 in stationary finger mode, it may be desirable for device 10 to require use of the moving finger mode in certain situations. For example, device 10 may require that fingerprint reader 20 be used in the moving finger mode whenever device 10 is using fingerprint reader 20 in connection with a financial transaction or other sensitive device operation. With this type of arrangement, attacks of the type that rely on reactivating a residual fingerprint will not be effective, because fingerprint data is only gathered while finger 42 is being moved.

Figure 4:
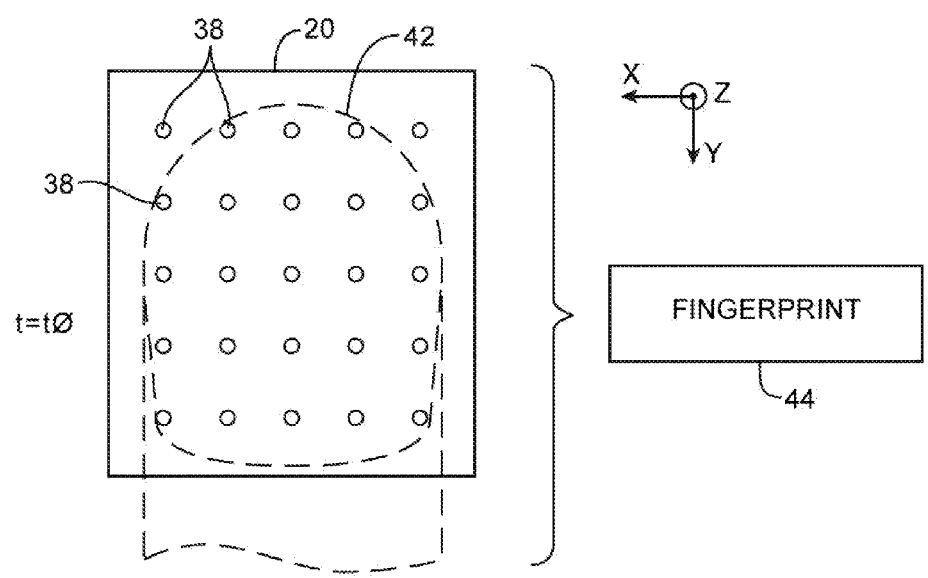
FIG. 4 is a top view of an illustrative fingerprint reader showing how a fingerprint may be captured while operating the fingerprint reader in a stationary finger mode in accordance with an embodiment of the present invention.

FIG. 4 is a top view of fingerprint reader 20 illustrating the process of capturing fingerprint data 44 from finger 42 when fingerprint reader 20 is operated in the stationary finger mode. In stationary finger mode, fingerprint reader 20 may use a two-dimensional array of sensors 38 to capture fingerprint data from finger 42 while finger 42 is being pressed against the surface of the fingerprint reader and held stationary (i.e., at a fixed X and Y position). Fingerprint reader 20 may use any suitable number of sensors 38 (e.g., tens, hundreds, or thousands of sensors 38). Because finger 42 is stationary, fingerprint data may be captured by reader 20 using sensor data from sensors 38 that is associated with a particular point in time (illustrated as time t=t0 in FIG. 4). If desired, a frame of sensor data (e.g., a frame associated with time t=t0) may be captured by rapidly acquiring data from all of sensors 38 in series, provided that there is no significant movement of finger 42 relative to any of sensors 38 throughout the data acquisition process (i.e., provided that finger 42 is held in place for the duration of the fingerprint capture operations).

Figure 5:
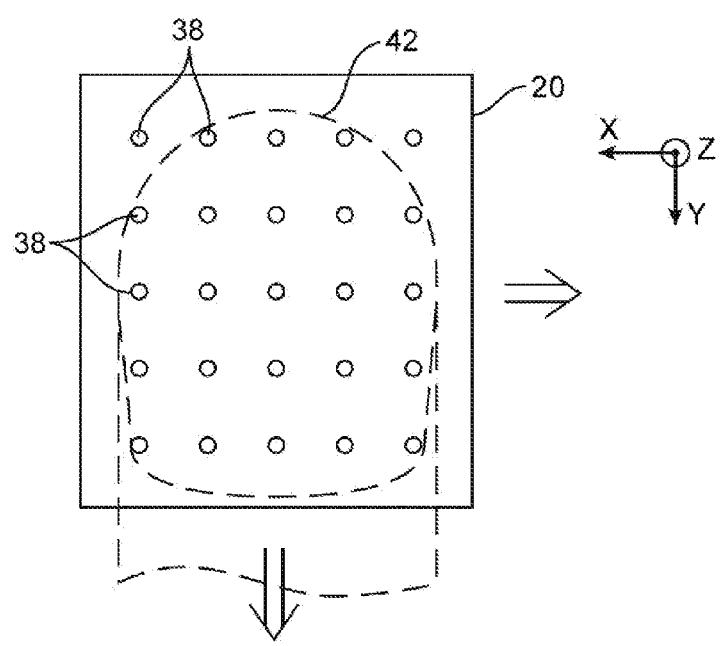
FIG. 5 is a top view of the illustrative fingerprint reader of FIG. 4 showing how a fingerprint may be captured by swiping a finger across the fingerprint reader while operating the fingerprint reader in a moving finger mode in accordance with an embodiment of the present invention.

FIG. 5 is a top view of fingerprint sensor 20 illustrating the process of capturing fingerprint data 44 from finger 42 when fingerprint reader 20 is operated in the moving finger mode. In moving finger mode, fingerprint reader 20 may use some or all of the sensors in a two-dimensional array of sensors 38 to capture fingerprint data from finger 42 while finger 42 is being swiped across the surface of the two-dimensional array (e.g., in direction Y, in direction X, or in a diagonal direction in the X-Y plane).

Figure 6:
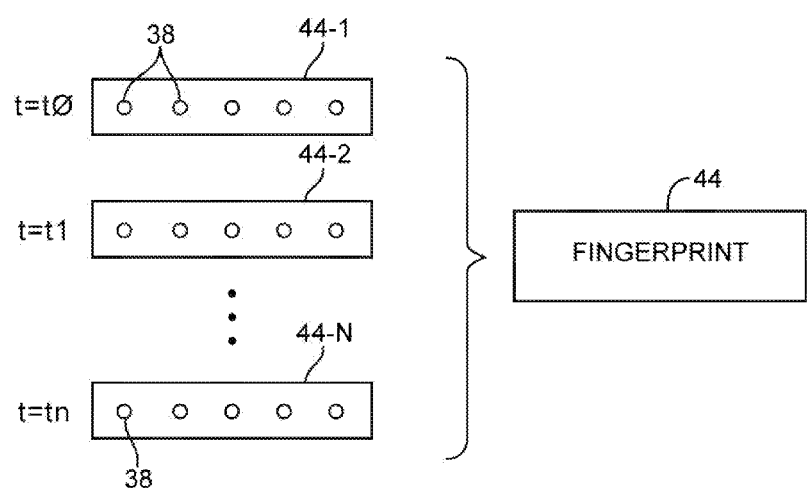
FIG. 6 is a diagram showing how a fingerprint may be constructed from multiple fingerprint data slices captured from a row of sensors in a fingerprint reader operating in a moving finger mode in accordance with the present invention.

Fingerprint reader 20 may use any suitable number of sensors 38 (e.g., tens, hundreds, or thousands of sensors 38) during operation in moving finger mode. With one suitable arrangement, which is illustrated in FIG. 6, a one-dimensional subset of sensors 38 in fingerprint reader 20 is used during moving finger mode. The one-dimensional subset of sensors 38 may be, for example, sensors in a selected row (or column) of the two-dimensional sensor array. As finger 42 is moved across the row of sensors 38, the row of sensors 38 may capture successive portions of the fingerprint for finger 42. For example, a first slice (row) of fingerprint data such as portion 44-1 may be captured by the row of sensors 38 at time t=t0, a second slice of fingerprint data such as fingerprint portion 44-2 may be captured by the row of sensors at time t=t1, and additional slices of fingerprint data may be captured by the row of sensors 38 at additional times (see, e.g., fingerprint data slice 44-N at time tn in the example of FIG. 6). The individual portions 44-1, 44-2, . . . 44-N of fingerprint data may be combined to form fingerprint 44.

Figure 7:
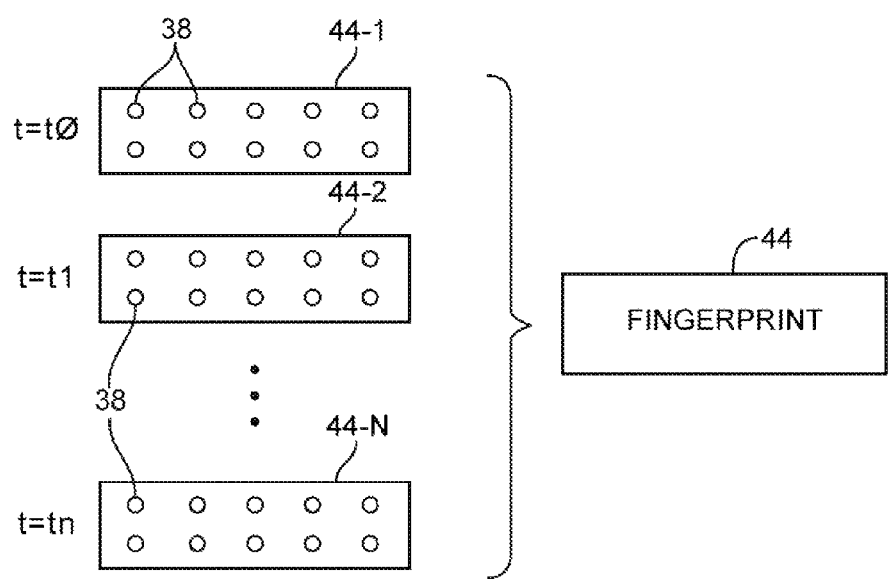
FIG. 7 is a diagram showing how a fingerprint may be constructed from multiple fingerprint data slices each captured from a pair of rows of sensors in a fingerprint reader operating in a moving finger mode in accordance with the present invention.

As shown in FIG. 7, each slice of fingerprint data that is captured during moving finger mode operations may correspond to multiple rows (or columns) of sensors 38 in the two-dimensional array of sensors in fingerprint reader 20. For example, device 10 may use two, three, or more than three rows (or other subset of sensors 38) in capturing fingerprint data slices 44-1, 44-2, . . . 44-N at respective times t0, t1, . . . tn. These captured portions of fingerprint data may be assembled by device 10 to form fingerprint data 44.

Figure 8:
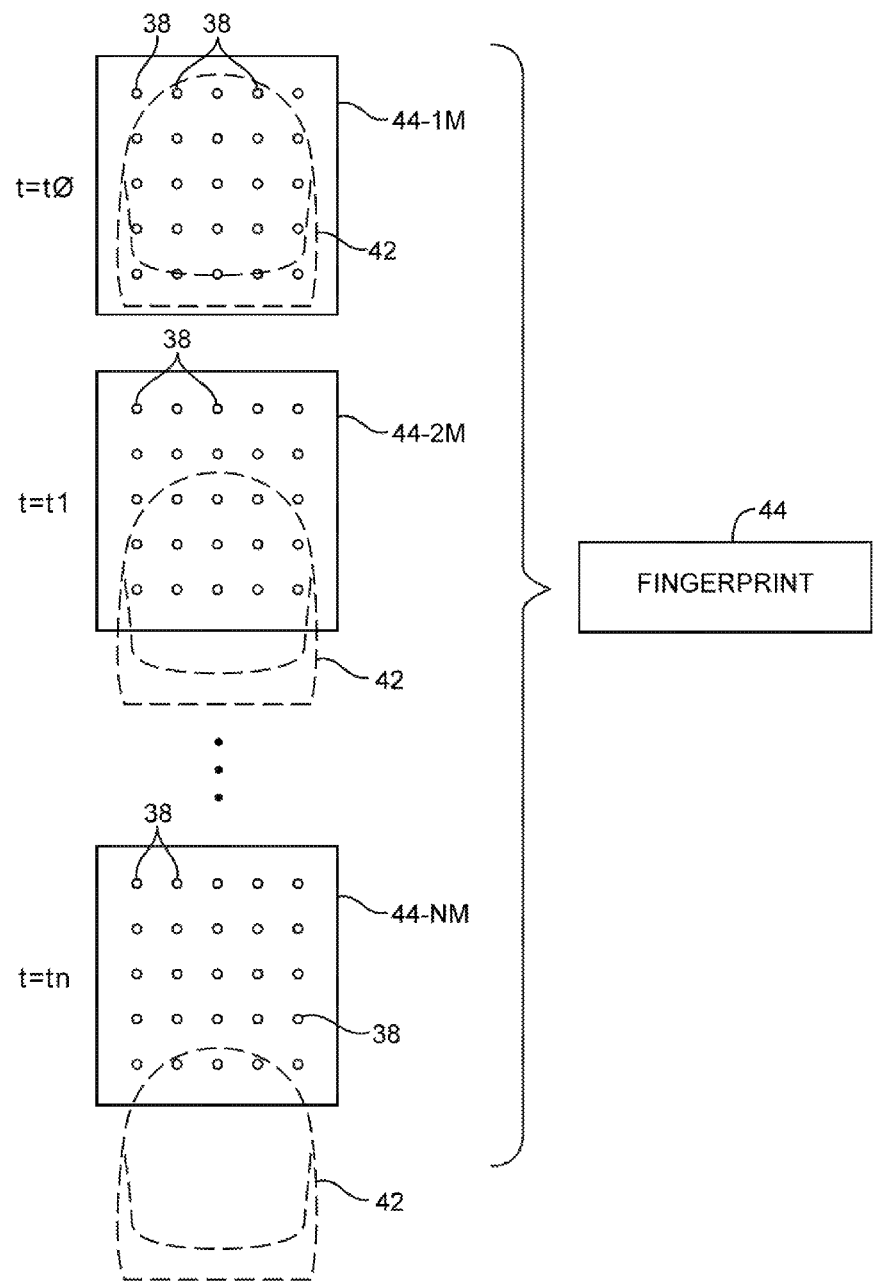
FIG. 8 is a diagram showing how a fingerprint may be constructed from multiple fingerprint data captures each of which involves use of all of the sensors in a two-dimensional array of sensors in the fingerprint reader while operating the fingerprint reader operating in a moving finger mode in accordance with the present invention.

FIG. 8 shows how all of the sensors in fingerprint reader 20 may be used during the moving finger mode. With this type of arrangement, fingerprint reader 20 may use a two-dimensional array of sensors 38 to capture a sequence of fingerprint images (e.g., fingerprint data capture 44-1M at time t=t0, fingerprint data capture 44-2M at time t=t1, . . . fingerprint data capture 44-NM at time t=tn). During subsequent processing operations, device 10 may extract relevant fingerprint data from each portion of fingerprint data and may assembly the extracted information to form a completed fingerprint such as fingerprint 44 of FIG. 8.

Figure 9:
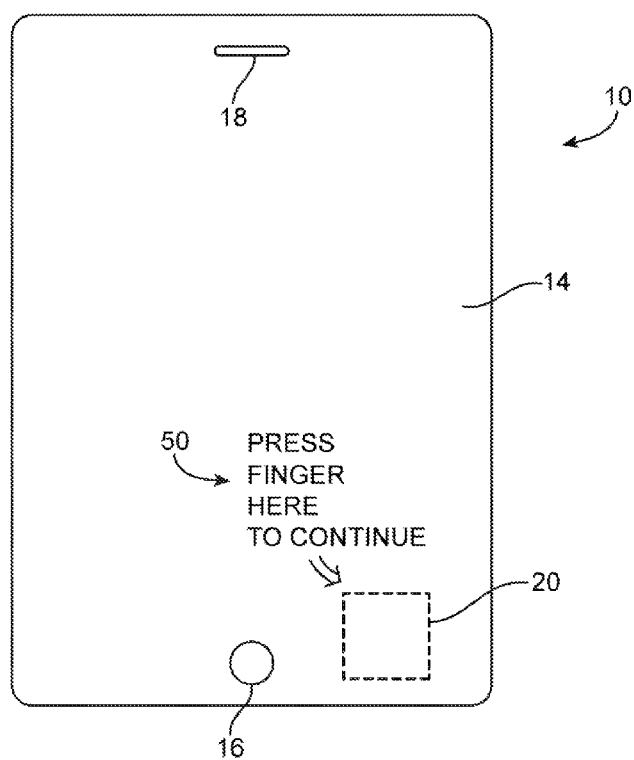
FIG. 9 is a front view of an illustrative electronic device with a fingerprint reader showing how the electronic device may display instructions for a user when operating the fingerprint reader in a stationary finger mode in accordance with an embodiment of the present invention.
Figure 10:
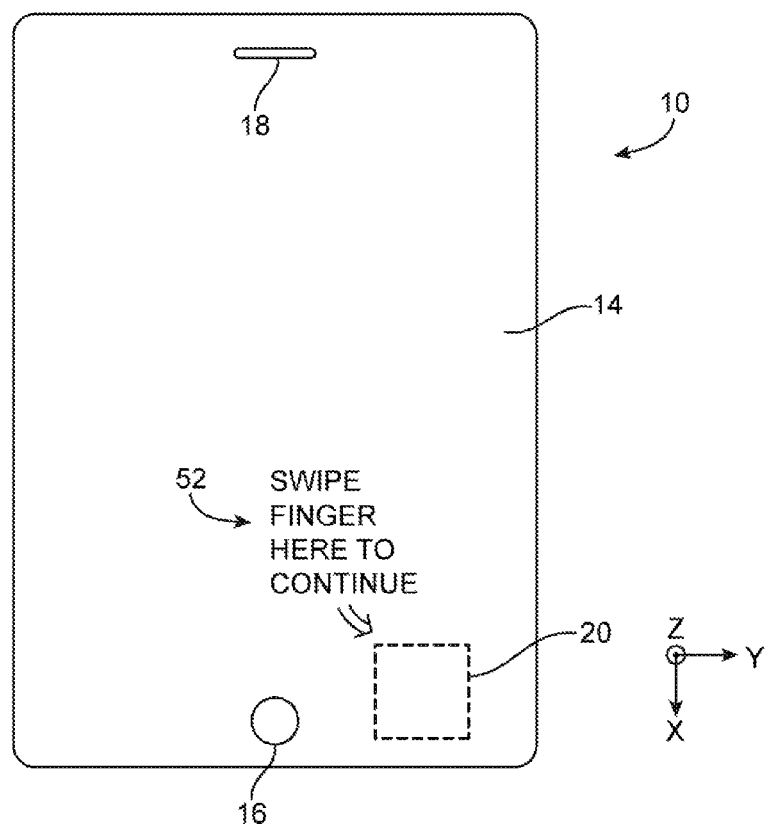
FIG. 10 is a front view of an illustrative electronic device with a fingerprint reader showing how the electronic device may display instructions for a user when operating the fingerprint reader in a moving finger mode in accordance with an embodiment of the present invention.

FIG. 9 is a front view of device 10 showing how device 10 may use storage and processing circuitry 22 to display instructions 50 for a user during fingerprint capture operations. In the FIG. 9 example, device 10 is operating in a stationary finger mode, so instructions 50 direct the user of device 10 to press a finger against fingerprint reader 20. FIG. 10 shows how device 10 may use storage and processing circuitry 22 to display instructions 52 for a user when fingerprint reader 20 is being operated in a moving finger mode. In particular, instructions 52 may instruct a user to move finger 42 across fingerprint reader 42. Instructions 52 may, for example, direct the user to swipe finger 42 in a particular direction such as direction Y or direction X or a diagonal direction in the X-Y plane. If the user attempts to activate the fingerprint reader by pressing finger 42 against fingerprint reader 20 in a stationary position when fingerprint reader 20 is being operated in moving finger mode, no valid fingerprint will be captured. As a result, attackers cannot successfully attack device 10 in moving finger mode by reactivating a stationary residual fingerprint left on reader 20 by a user.

Figure 11:
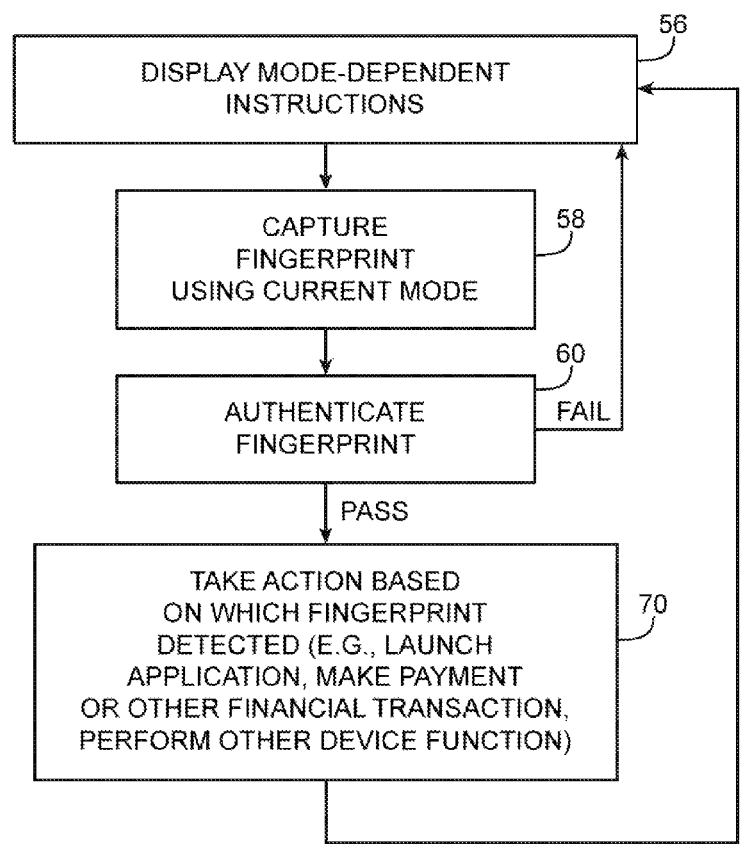
FIG. 11 is a flow chart of illustrative steps involved in displaying mode-dependent fingerprint reader operating instructions for a user in accordance with an embodiment of the present invention.

FIG. 11 is a flow chart of illustrative steps involved in operating device 10 when displaying instructions such as instructions 50 and 52 of FIGS. 9 and 10. During the operation of device 10, input-output circuitry 24 may receive user input or other input that directs device 10 to take particular actions. For example, device 10 may be instructed to launch an application or operating system function on device 10 or may be directed to take a particular action within an application or operating system when a user clicks on an on-screen option. The operating system or other software running on device 10 may be configured to automatically take actions when other criteria have been satisfied (e.g., when a particular time and date have been reached, etc.).

When appropriate (e.g., when directed by a user or in response to the satisfaction of other criteria), device 10 may use fingerprint reader 20 to capture a user's fingerprint. In some situations, device 10 may require a user to present a valid fingerprint before taking a sensitive action such as making a wireless payment using NFC circuitry 34 (FIG. 1) or consummating other financial transactions. In other situations, fingerprints may be required before device 10 will perform particular actions even though the actions are not particularly sensitive. For example, device 10 may require that the user present a fingerprint (e.g., a particular fingerprint from among the user's ten possible fingerprints) before launching a game application.

The mode in which fingerprint reader 20 is operated may depend on the type of fingerprint-related activity that is involved. For example, if device 10 is gathering a fingerprint from a user in connection with a sensitive operation such as a financial transaction, device 10 may require that fingerprint reader 20 be operated in a moving finger mode. If, however, device 10 is gathering a fingerprint from a user in connection with non-financial activities, such as activities involved in launching or operating a game, device 10 may desire to use fingerprint reader 20 in a stationary finger mode. The stationary finger mode may, for example, be used in connection with all activities that do not involve sensitive information.

As shown in FIG. 11, device 10 may display mode-dependent instructions for a user on display 14 (step 56). Device 10 may, for example, decide that a pending financial transaction involves sensitive banking information. Accordingly, device 10 may direct the user to swipe a finger across fingerprint reader 20 by displaying instructions such as instructions 52 of FIG. 10 on display 14. As another example, device 10 may decide that the process of performing a task within a game application requires confirmation from the user in the form of a fingerprint from a stationary finger. Because the game task is not sensitive (in this example), device 10 may display instructions such as instructions 50 of FIG. 9 that direct the user to press the user's finger against fingerprint reader 20 so that a fingerprint may be acquired in a stationary finger mode of operation.

After informing the user whether to place a stationary or moving finger on fingerprint reader 20, device 10 may use storage and processing circuitry 22 and fingerprint reader 20 to capture a fingerprint from the user (step 58). During the operations of step 58, device 10 may capture fingerprint data from the user in the stationary finger mode or the moving finger mode, corresponding to the instructions presented during the operations of step 56.

At step 60, device 10 may authenticate the user by comparing the captured fingerprint data to registered fingerprint data. The registered fingerprint data may be, for example, stored in device 10 or may be stored on equipment with which device 10 is communicating (e.g., equipment with which device 10 is communicating wirelessly). If the captured fingerprint data does not match previously registered valid fingerprint data for the user, the authentication process may fail and processing may return to step 56 (as an example). If the captured fingerprint data matches previously registered valid fingerprint data for the user, the authentication process may pass (i.e., the user may be successfully authenticated using the stationary or swiped fingerprint).

A user may register one or more fingerprints. For example, a user may register one fingerprint to use in all authentication scenarios, the user may register two fingerprints (e.g., a primary print and a secondary or backup print), or may register two or more fingerprints to use. In configurations in which a user registers multiple fingerprints, device 10 may be configured to take different actions depending on which fingerprint is successfully authenticated (step 70). For example, if a first of the user's fingerprints is captured, device 10 may launch a first application on device 10 (or may take a first action within an application). If a second of the user's fingerprints is captured, device 10 may launch a second application on device 10 (or may take a second action within an application). If a third of the user's fingerprints is captured, device 10 may make a financial transaction. If a fourth of the user's fingerprints is captured, device 10 may make an adjustment to an audio feature. If a fifth of the user's fingerprints is captured, device 10 may adjust a communications function in device 10, etc.

Combinations of fingers may also be used to initiate desired actions. For example, a first action may be taken in response to capturing a first fingerprint followed by a fifth fingerprint and a second action may be taken in response to capturing a third fingerprint followed by a second fingerprint (as examples). After appropriate actions have been taken by device 10 in response to capturing one or more successfully authenticated user fingerprints, processing may return to step 56 (as an example).

Device operations associated with gathering fingerprints may be triggered in response to user input, sensor input, or other criteria. With one suitable arrangement, wireless activity, financial transaction activity, or other types of activity may trigger the process of authenticating a user using stationary or moving fingerprint data. For example, device 10 may require that a user present a valid fingerprint in response to detecting a beacon or other wireless signal associated with near field communications. Device 10 may contain near field communications circuitry such as circuitry 34 of FIG. 2. When a user desires to use device 10 to make a purchase at a store, the user may place device 10 in the vicinity of a near field communications terminal. When in sufficiently close proximity, the terminal and device 10 may communicate wirelessly using NFC signals. In response to the detection and/or use of NFC signals, device 10 may require that the user authenticate using a fingerprint.

Figure 12:
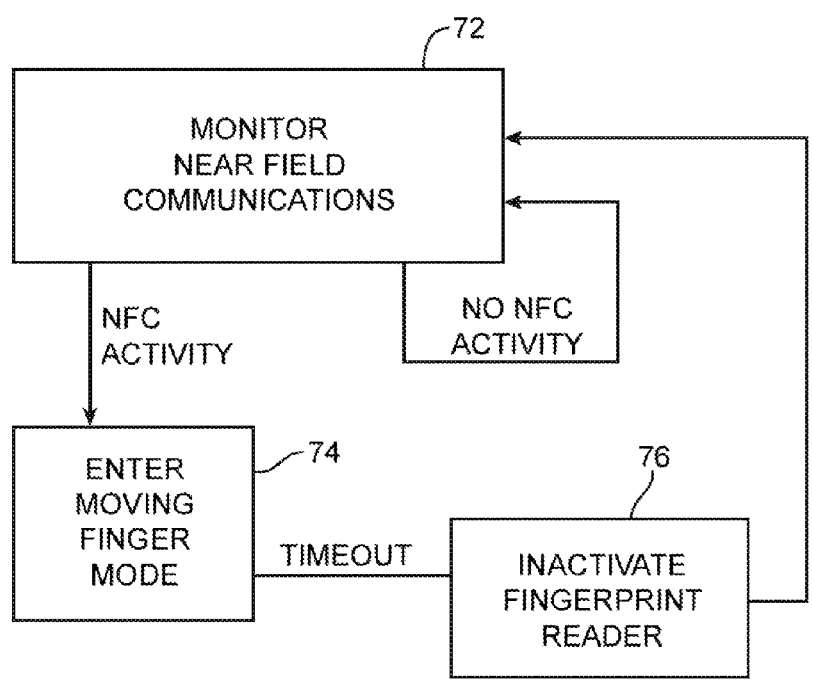
FIG. 12 is a flow chart of illustrative steps involved in using near field communications circuitry in an electronic device to monitor for wireless communications activity and entering an appropriate fingerprint reader operating mode in response to detecting the wireless communications activity in accordance with an embodiment of the present invention.

A flow chart of operations involved in using device 10 to gather a fingerprint in response to detection of NFC signals is shown in FIG. 12. At step 72, device 10 may be operated in a store or other establishment with near field communications equipment. During normal operation or when a particular type of operation is invoked (e.g., a payment function), device 10 may use circuitry 34 to monitor for NFC signals (step 72). So long as no NFC activity is detected, device 10 may continue to use circuitry 34 monitor the environment for NFC signals. When device 10 is brought into proximity with a near field communications terminal or other NFC equipment, device 10 may detect the presence of NFC signals. In response to detection of NFC activity between device 10 and external NFC equipment, device 10 may enter an appropriate fingerprint detection mode. For example, device 10 may enter moving finger mode, as shown by step 74 in FIG. 12. If no valid fingerprint is presented to fingerprint reader within a predetermined time period, fingerprint reader 20 may be inactivated (step 76). If user presents a valid fingerprint to fingerprint reader 20 (e.g., if the user presents a valid fingerprint while reader 20 is operating in moving finger mode), device 10 may take suitable actions (e.g., a financial transaction may be completed using NFC circuitry 34).

Device 10 may use a sensor such as proximity sensor 40 of FIG. 3 to detect when finger 42 is within close proximity to fingerprint reader 20. When the user's finger is not present, device 10 can deactivate fingerprint reader 20 (i.e., device 10 may not monitor fingerprint reader 20 for fingerprint data). When the user's finger is present, device 10 may activate fingerprint reader 20 (i.e., device 10 may monitor fingerprint reader 20 for fingerprint data from a user).

Figure 13:
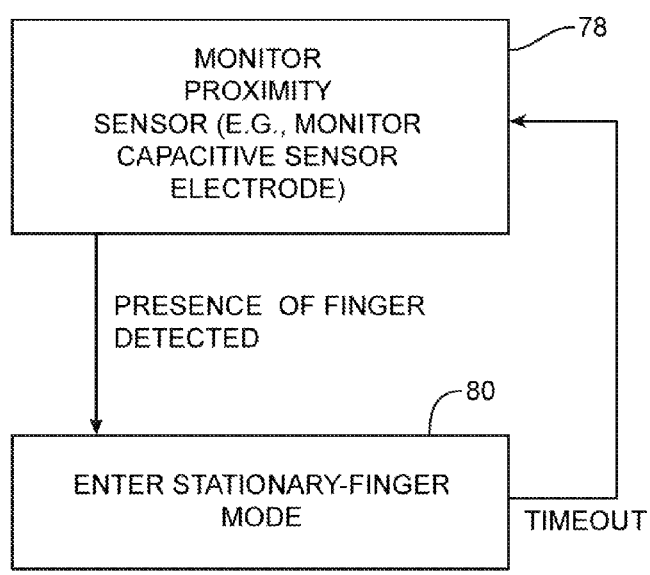
FIG. 13 is a flow chart of illustrative steps involved in monitoring a proximity sensor associated with a fingerprint reader and activating the fingerprint reader in response to detecting the presence of a finger in the vicinity of the fingerprint reader in accordance with an embodiment of the present invention.

FIG. 13 is a flow chart of illustrative steps involved in monitoring fingerprint reader 20 for fingerprint data in a device such as device 10 having a proximity sensor such as proximity sensor 40 of FIG. 3. During the operations of step 78, storage and processing circuitry 22 in device 10 may use data from proximity sensor 40 to determine whether or not finger 42 is in the vicinity of fingerprint reader 20. Sensor 40 may, for example, be used to determine whether finger 42 is within a given distance of fingerprint reader 20 (e.g., 1 cm or less, 1 mm or less, etc.). The hardware of sensor 40 may be separate from fingerprint reader 20 or may be integrated with fingerprint reader 20 (e.g., as part of sensors 38 or as a separate sensor).

In response to detecting the presence of finger 42 during the operations of step 78, device 10 can activate fingerprint reader 20 and can monitor fingerprint reader 20 for a fingerprint from the user (step 80). During the monitoring operations of step 80, device 10 may operate fingerprint reader 20 in an appropriate fingerprint reading mode. For example, device 10 may operate fingerprint reader 20 in a stationary finger mode (as shown in FIG. 13) or a moving finger mode. Following a period of inactivity (e.g., a time period that exceeds a predetermined timeout value), device 10 can stop gathering fingerprint data. Device 10 may then return to the processing operations of step 78 and may use sensor 40 to monitor the vicinity of fingerprint reader 20 for the presence of finger 42.

Figure 14:
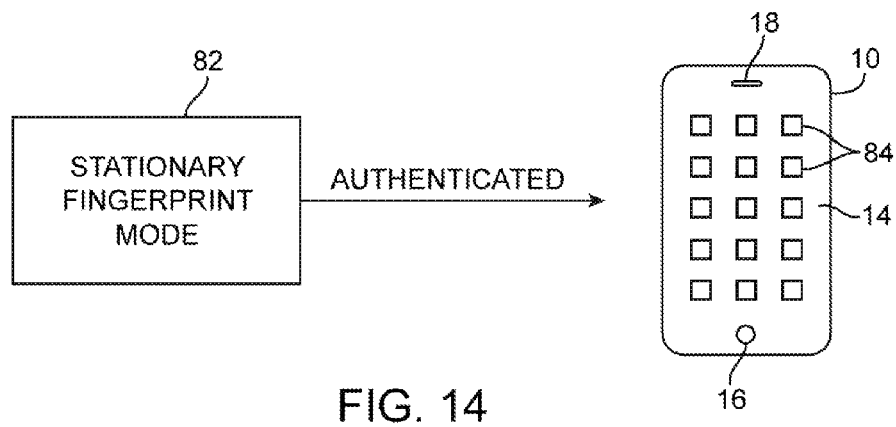
FIG. 14 is a diagram showing how an electronic device that is operating a fingerprint reader in a stationary finger mode may unlock a display screen or take other suitable actions in response to capturing a valid fingerprint from a user in accordance with an embodiment of the present invention.

Device 10 may take any suitable actions in response to detection of a valid fingerprint using fingerprint reader 20. As shown in FIG. 14, device 10 may operate in a stationary finger mode (mode 82) in which device 10 waits for the user to present a valid fingerprint to reader 20. During the operation of mode 82, device 10 may lock the screen of device 10 (i.e., application icons and other user-selectable options associated with launching and using particular applications and operating system functions may be hidden from view). In response to the capture of a valid fingerprint, device 10 may take an appropriate action such as unlocking the locked screen. When the screen is unlocked, user-selectable application icons 84 may be presented on screen 14 of device 10, as shown on the right-hand side of FIG. 14.

Figure 15:
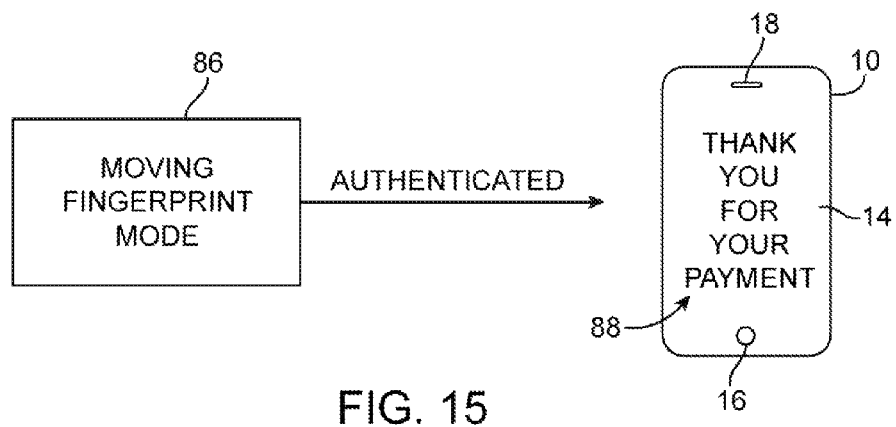
FIG. 15 is a diagram showing how an electronic device that is operating a fingerprint reader in a moving finger mode may complete a financial transaction such as a wireless payment transaction in response to capturing a valid fingerprint from a user in accordance with an embodiment of the present invention

As shown in FIG. 15, device 10 may operate in a moving finger mode (mode 86) in which device 10 waits for the user to present a valid fingerprint from a moving finger to reader 20. During the operation of mode 86, device 10 may communicate with external equipment such as near field communications equipment in a store or other establishment using NFC circuitry 34 (as an example). A payment transaction or other transaction associated with a user purchase at the store may be partly completed and awaiting final authorization from the user in the form of a valid fingerprint from a moving finger. When the user presents a valid fingerprint to fingerprint reader 20 by moving finger 42 across fingerprint reader 20, device 10 may complete the payment transaction and may display a confirmatory message such as message 88 for the user, as shown on the right-hand side of FIG. 15.

As the examples of FIGS. 14 and 15 illustrate, device 10 may choose to use the stationary finger mode in authorizing less-sensitive actions such as launching certain applications or other less-sensitive software functions and may choose to use the moving finger mode in authorizing sensitive actions such as operations associated with financial transactions.

Figure 16:
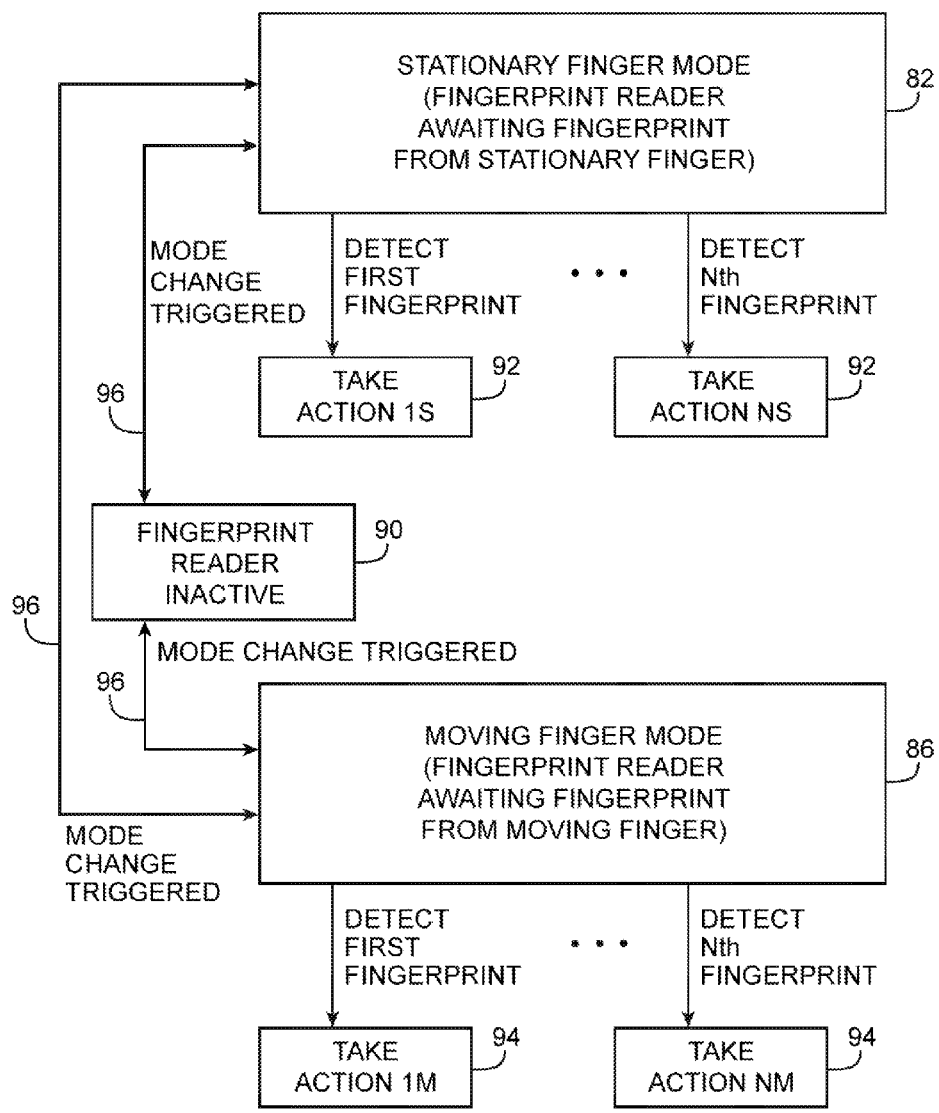
FIG. 16 is a flow chart of illustrative steps involved in operating an electronic device with a fingerprint reader in a stationary finger mode, a moving finger mode, and a fingerprint reader inactive mode in accordance with an embodiment of the present invention.

FIG. 16 is a flow chart of illustrative steps involved in operating device 10 in modes such as stationary finger mode 82 in which device 10 uses fingerprint reader 20 to capture fingerprints from stationary fingers, moving finger mode 86 in which device 10 uses fingerprint reader 20 to capture fingerprints form a moving (swiped) finger, and fingerprint reader inactive mode 90 in which device 10 is not actively capturing fingerprint data with fingerprint reader 20.

When operating in stationary finger mode 82, device 10 may display instructions such as instructions 50 of FIG. 9 while monitoring fingerprint reader 20 for a valid fingerprint from a stationary finger. When a valid fingerprint is received, device 10 may take an appropriate action. For example, device 10 may invoke a software feature, may take action in software that is running, etc. As shown in FIG. 16, device 10 may take different actions 92 in response to the presentation of different fingerprints to a fingerprint reader operating in stationary finger mode. For example, a device 10 may launch a first application in response to a valid fingerprint from the user's index finger and may launch a second application in response to receiving a valid fingerprint from the user's ring finger.

When operating in moving finger mode 86, device 10 may display instructions such as instructions 52 of FIG. 10 while monitoring fingerprint reader 20 for a valid moving (swiped) fingerprint. When a valid fingerprint from a moving finger is received, device 10 may take an appropriate action. For example, device 10 may invoke a software feature, may take action in software that is running, etc. As shown in FIG. 16, device 10 may take different actions 94 in response to the presentation of different fingerprints from moving fingers. For example, a device 10 may launch a first application in response to a valid fingerprint gathered during a swipe from the user's index finger and may launch a second application in response to receiving a valid fingerprint gathered during a swipe from the user's ring finger.

After taking actions such as actions 92 and 94, device 10 may revert to mode 82 to monitor fingerprint reader for additional stationary-finger fingerprint input, may revert to mode 86 to monitor fingerprint reader 20 for additional moving-finger fingerprint input, or may revert to fingerprint reader inactive mode 90 (i.e., a mode in which fingerprint data is not being actively collected using fingerprint reader 20).

As illustrated by lines 96, device 10 may transition between modes 82, 86, and 90 in response to appropriate triggering events. For example, device 10 may transition from fingerprint reader inactive mode to mode 82 or mode 86 upon detecting proximity of a user's finger using proximity sensor

40. As another example, device 10 may transition from mode 82 or mode 86 to mode 90 in response to a timeout condition (e.g., sensing inactivity with reader 20 for more than a predetermined timeout period). Device 10 may transition between mode 82 and mode 86 when NFC signals are detected or when other conditions are detected that warrant increased security. These are merely illustrative examples. In general, device 10 may operate in any suitable fingerprint recognition modes.

The foregoing is merely illustrative of the principles of this invention and various modifications can be made by those skilled in the art without departing from the scope and spirit of the invention.

What is claimed is:

1. An electronic device, comprising:
    a fingerprint reader comprising a two-dimensional array of sensors;
    wireless communications circuitry; and
    control circuitry, wherein the control circuitry is configured to operate the fingerprint reader in a stationary finger mode in which the control circuitry captures a fingerprint from a stationary finger with the two-dimensional array of sensors and a moving finger mode in which the control circuitry captures a fingerprint from a moving finger with only a subset of the two-dimensional array of sensors, wherein the control circuitry is configured to operate the fingerprint reader in the moving finger mode in response to wireless activity detected by the wireless communications circuitry, and wherein the wireless communications circuitry comprises near field communications circuitry.

2. The electronic device defined in claim 1 wherein the control circuitry is configured to take action in response to capturing a valid fingerprint from a stationary finger while operating the fingerprint reader in the stationary finger mode.

3. The electronic device defined in claim 2 wherein the control circuitry is configured to take action in response to capturing a valid fingerprint as a user swipes a finger across the fingerprint reader while operating the fingerprint reader in the moving finger mode.

4. The electronic device defined in claim 1 further comprising a display, wherein the fingerprint reader gathers fingerprints on a portion of the display.

5. The electronic device defined in claim 1 wherein the two-dimensional array of sensors comprise sensors selected from the group consisting of:
    capacitive sensors, radio-frequency sensors, light sensors, and pressure sensors.

6. The electronic device defined in claim 4 wherein the display comprises at least one display layer and wherein the sensors comprise a two-dimensional array of capacitive sensor electrodes on the display layer.

7. The electronic device defined in claim 6 wherein the control circuitry is configured to use the fingerprint reader to detect multiple distinct fingerprints from a user and is configured to take a different respective action in response to detecting each of the multiple distinct fingerprints from the user.

8. The electronic device defined in claim 7 wherein the actions comprise launching applications and wherein the control circuitry is configured to launch a different one of the applications in response to detection of each of the multiple distinct fingerprints.

9. The electronic device defined in claim 1 wherein the fingerprint reader comprises a proximity sensor and wherein the control circuitry is configured to use the fingerprint reader to monitor for fingerprints in response to detection of a finger using the proximity sensor.

10. A method for using a fingerprint reader in an electronic device, wherein the electronic device comprises wireless communications circuitry, the method comprising:
    with a proximity sensor, detecting whether a finger is within a given distance of the fingerprint reader;
    in response to detecting a finger within the given distance of the fingerprint reader with the proximity sensor, activating the fingerprint reader, wherein activating the fingerprint reader comprises with control circuitry in the electronic device, operating the fingerprint reader in a stationary finger mode in which the control circuitry authenticates users by monitoring the fingerprint reader for a fingerprint associated with a user's finger in a stationary position on the fingerprint reader and operating the fingerprint reader in a moving finger mode in which the control circuitry authenticates users by monitoring the fingerprint reader for a fingerprint captured by swiping the user's finger across the fingerprint reader; and
    with the control circuitry, operating the fingerprint reader in the moving finger mode in response to detection of wireless activity with the wireless communications circuitry, wherein the wireless communications circuitry comprises near field communications circuitry.

11. The method defined in claim 10 further comprising: with the control circuitry, using the fingerprint reader to recognize different fingerprints of a user and, in response to capturing each different fingerprint with the fingerprint reader, taking a different respective action.

12. The method defined in claim 11 wherein the different respective actions comprise at least one action selected from the group consisting of: launching an application, performing an operation in an application, performing an operating system function, completing a wireless payment transaction, and unlocking a display screen.

13. A method for operating a fingerprint reader in an electronic device having control circuitry and wireless communications circuitry, wherein the fingerprint reader includes a two-dimensional array of sensors arranged in rows and columns, the method comprising:
    detecting wireless activity with the wireless communications circuitry;
    with the control circuitry, operating the fingerprint reader in a stationary finger mode in which each of the sensors is used in capturing a fingerprint from a finger that is in a stationary position on the fingerprint reader and operating the fingerprint reader in a moving finger mode in which only a subset of the rows of the two-dimensional array of sensors is used in capturing a fingerprint from a finger that is being swiped across the fingerprint reader; and
    with the control circuitry, in response to detecting wireless activity with the wireless communications circuitry, operating the fingerprint reader in the moving finger mode, wherein the wireless communications circuitry comprises near field communications circuitry.

14. The method defined in claim 13 wherein the electronic device comprises a display, the method further comprising: displaying instructions on the display that instruct the user to place a stationary finger on the fingerprint reader in the stationary finger mode and that instruct the user to swipe a finger across the fingerprint reader in the moving finger mode.

15. The method defined in claim 10, further comprising in response to not detecting a finger within the given distance of the fingerprint reader with the proximity sensor, deactivating the fingerprint reader.

* * * * *